United States Patent [19]

Worby

[11] 4,179,072

[45] Dec. 18, 1979

[54] FUEL INJECTOR

[75] Inventor: Donald Worby, Stonehouse, England

[73] Assignee: Lucas Industries Limited, Birmingham, England

[21] Appl. No.: 873,780

[22] Filed: Jan. 31, 1978

[30] Foreign Application Priority Data

Feb. 12, 1977 [GB] United Kingdom ................. 6007/77

[51] Int. Cl.² ......................... B05B 1/30; F16K 21/10

[52] U.S. Cl. .................................................. 239/533.9

[58] Field of Search ............... 239/533.3, 533.4, 533.5, 239/533.6, 533.7, 533.8, 533.9, 533.11, 533.12; 267/177

[56] References Cited

U.S. PATENT DOCUMENTS

| | | | |
|---|---|---|---|
| 1,735,718 | 11/1929 | Attendu | 239/533.6 X |
| 3,627,207 | 12/1971 | Hohmuth | 239/533.6 |
| 3,722,801 | 3/1973 | Chaduis | 239/533.6 X |

*Primary Examiner*—Robert W. Saifer

[57] ABSTRACT

A fuel injector, which is principally for use in a compression ignition engine, comprises a body having a bore therethrough in which a valve member is slidably mounted for co-operation with a seating to control the flow of fuel past the latter, the valve member being biased into engagement with the seating by a compression spring. The biasing force of the spring, and therefore the fuel pressure at which the valve member opens, can be adjusted by rotating a collar relative to the body. The collar is both internally and externally screw-threaded, and engages complementary threading on the interior of the bore. An externally screw-threaded retaining member engages the internal threading on the collar and also has an abutment which engages the body, the retaining member serving to retain the collar in position in the bore. Once the biasing force of the spring has been set by rotating the collar, the retaining member prevents the collar from being inadvertently rotated subsequently.

2 Claims, 2 Drawing Figures

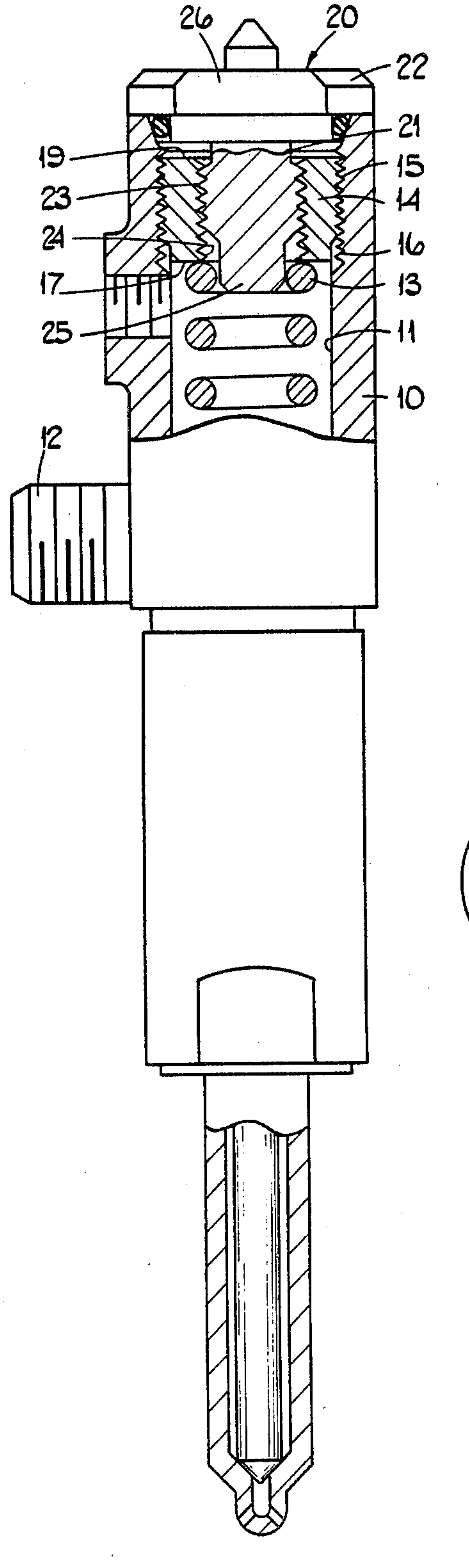
FIG. 1.
FIG. 2.
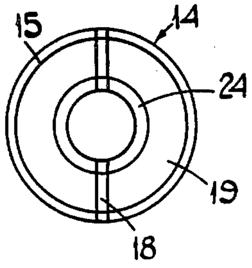

FUEL INJECTOR

This invention relates to a fuel injector particularly, though not exclusively, for use in a compression ignition engine.

According to the present invention, there is provided a fuel injector comprising a body having a bore therethrough, a seating, a valve member slidable within the bore and co-operating with the seating to control the flow of fuel therepast, means biasing the valve member into engagement with the seating, a collar disposed in the bore and having internal and external screw-threading thereon, the external screw-threading being engaged with complementary screw-threading on the interior of the bore, rotation of the collar relative to the body being arranged to adjust the biasing force of the biasing means, and a retaining member for retaining the collar in position in the bore, the retaining member having external screw-threading engaged with the internal screw-threading on the collar and including an abutment which is engageable with the body.

Preferably the biasing means is in the form of a compression spring, and the retaining member has a portion which projects beyond one axial end of the collar and around which an end of the spring is fitted.

An embodiment of the present invention will now be described, by way of example, with reference to the accompanying drawing, in which:

FIG. 1 is a side view, partly in section, of a fuel injector according to the present invention for use in a compression ignition engine; and FIG. 2 is a plan view of a collar forming part of the injector of FIG. 1.

Referring to the drawing, the fuel injector comprises a body 10 having a bore 11 therethrough. Slidably housed in the bore 11 is a valve member which co-operates with a seating to control the flow of fuel from an inlet 12 into a combustion space in the compression ignition engine (not shown). The valve member and seating are not shown in the drawing, but it is to be understood that their construction and arrangement is entirely conventional. The valve member is biased into engagement with the seating by the action of a compression spring 13 which is housed within the bore 11. Interposed between the spring and the valve member is a spring spindle. The spring 13 controls the pressure at which the valve member is lifted off the seating to permit fuel to be injected into the engine. The force exerted by the spring 13, and hence the pressure at which injection takes place, can be adjusted by rotating a collar 14 relative to the body 10.

The collar 14 is shown in detail in FIG. 2, and has external screw-threading 15 thereon which engages complementary screw-threading 16 on the interior of the bore 11 at one end thereof. The spring 13 engages one axial end surface 17 of the collar 14, and it will be manifest that rotation of the collar will cause the spring 13 to be compressed or extended, thereby raising and lowering respectively the pressure at which injection takes place. A diametrically extending slot 18 in the other axial end surface 19 of the collar 14 provides a key whereby the collar 14 can be rotated.

The collar 14 is retained in position in the bore 11 by a retaining member 20 including a shank 21 and a head 22. The shank 21 is provided with external screw-threading 23 which engages complementary screw-threading 24 on the interior of collar 14. A portion 25 of the shank 21 extends beyond the end surface 17 of collar 14, and an end of the spring 13 is closely fitted around the portion 25; portion 25 thus serves to locate the end of spring 13. The head 22 of the retaining member 20 engages an axial end of the body 10 and provides an abutment preventing the member 20 from further entering the body 10. The head 22 is of circular form, but has a pair of flats 26 (only one visible in FIG. 1) on its radially outer periphery which provide a key for rotation of the member 20. A sealing ring 27 is disposed between the member 20 and the interior surface of bore 11.

The injector is assembled as follows. Once the valve member, valve spindle and spring 13 have been inserted in the bore 11, the collar 14 is engaged with the screw-threading 16 and is screwed down into the bore 11 until it has engaged the end of spring 13 and the desired biasing force has been obtained. The retaining member 20 is then engaged with the threading 24 on the collar 14 and is screwed down until the head 22 engages the end of body 10. During this time, the collar 14 remains in the position in which it was previously set, thereby maintaining the spring 13 at the desired biasing force.

I claim:

1. A fuel injector comprising a body having a bore therethrough, a seating, a valve member slidable within the bore and co-operating with the seating to control the flow of fuel therepast, means biasing the valve member into engagement with the seating, a collar disposed in the bore and having internal and external screw-threading thereon, the external screw-threading being engaged with complementary screw-threading on the interior of the bore, rotation of the collar relative to the body being arranged to adjust the biasing force of the biasing means, and a retaining member for retaining the collar in position in the bore, the retaining member having external screw-threading engaged with the internal screw-threading on the collar and including an abutment which is engageable with the body.

2. A fuel injector as claimed in claim 1, wherein the biasing means is in the form of a compression spring, and the retaining member has a portion which projects beyond one axial end of the collar and around which an end of the spring is fitted.

* * * * *